United States Patent [19]

Gaiser

[11] Patent Number: 4,588,205
[45] Date of Patent: May 13, 1986

[54] BRAKE SYSTEM

[75] Inventor: Robert F. Gaiser, Stevensville, Mich.

[73] Assignee: Allied Corporation, Morristown, N.J.

[21] Appl. No.: 653,002

[22] Filed: Sep. 21, 1984

[51] Int. Cl.⁴ .......................................... B60G 11/14
[52] U.S. Cl. .................................. 280/725; 188/141;
        188/152; 188/181 T; 280/703; 280/714
[58] Field of Search ............. 280/667, 701, 703, 714,
        280/725; 188/141, 152, 181 T, 182

[56] References Cited

U.S. PATENT DOCUMENTS

| | | | |
|---|---|---|---|
| 3,182,760 | 5/1965 | Stelzer | 188/152 |
| 3,268,038 | 8/1966 | Bauman | 188/152 |
| 3,349,875 | 10/1967 | Stelzer | 188/152 |
| 3,375,909 | 4/1968 | Lepelletier | 188/152 |
| 3,404,758 | 10/1968 | Mortimer | 188/181 T |
| 3,490,566 | 1/1970 | von Keszycki | 188/181 T |
| 3,542,164 | 11/1970 | Mortimer | 188/141 |
| 3,695,733 | 10/1972 | Alderton | 188/181 T |
| 3,953,081 | 4/1976 | King | 188/181 T |
| 4,099,792 | 7/1978 | Schmid et al. | 188/181 T |

Primary Examiner—John J. Love
Assistant Examiner—Kenneth R. Rice
Attorney, Agent, or Firm—Larry J. Palguta; Ken C. Decker

[57] ABSTRACT

A brake system utilizes an auxiliary chamber defined by a control rod to control a brake assembly. The auxiliary chamber supports braking during a normal brake application and relieves the brake application forces in response to a skidding condition for a wheel assembly associated with the brake assembly.

6 Claims, 5 Drawing Figures

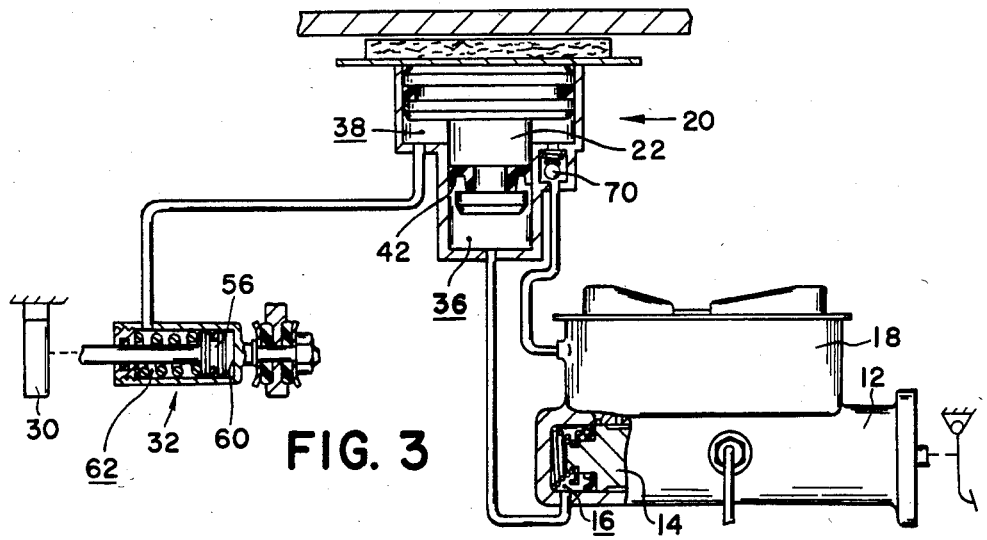
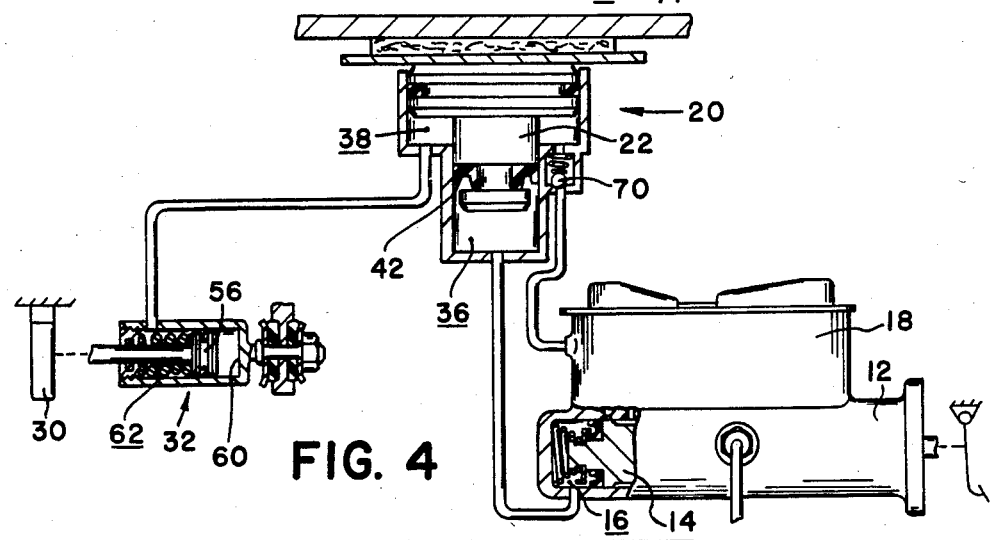
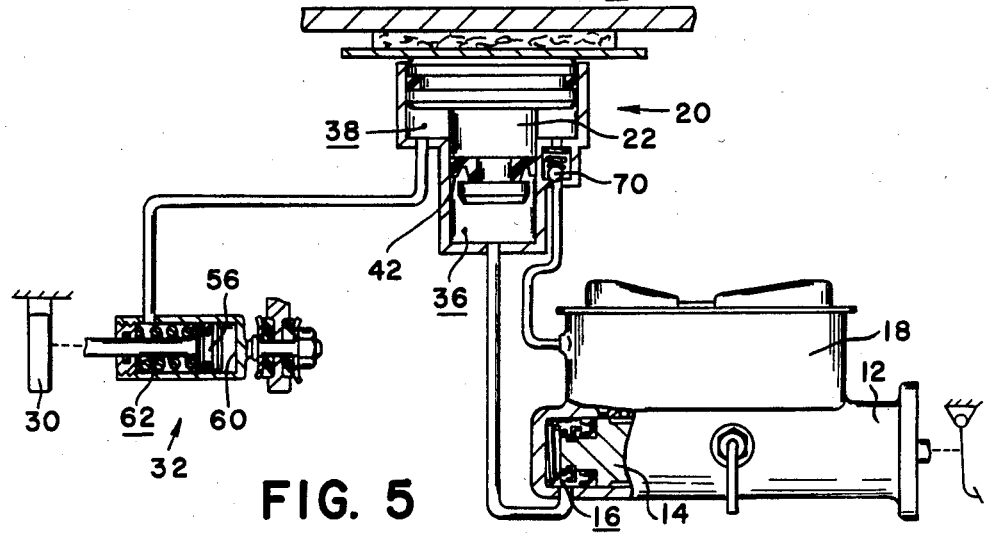

BRAKE SYSTEM

The present invention covers a brake system which provides a power assist during braking and a pressure or force reduction during a skidding condition for a vehicle.

In U.S. Pat. No. 3,268,038, a drum brake assembly is provided with a separate chamber for communicating fluid pressure to a wheel cylinder independently of the fluid pressure communicated thereto by a master cylinder. The separate chamber is defined in the extendible strut so that braking torque developed by a leading brake shoe will generate fluid pressure in the separate chamber for communication to the wheel cylinder. If the wheel assembly and drum associated therewith are locked during braking the servo action of the drum brake is terminated and less torque is transferred to the extendible strut to reduce the fluid pressure communicated from the separate chamber to the wheel cylinder. When the fluid pressure is communicated to the wheel cylinder from the separate chamber, the fluid pressure acts in opposition to that fluid pressure generated by the master cylinder. As a result the vehicle operator feels an undesireable bump in the brake pedal biasing the brake pedal to a brake-released position. Moreover, the fluid pressure generated by the master cylinder is utilized in the wheel cylinder to compress the trapped fluid in the separate chamber so that hydraulic slack is introduced in the brake system by the separate chamber.

Other devices concerned with anti-skid and/or torque controlled braking are illustrated in U.S. Pat. Nos. 3,404,758 and 3,542,164.

The present invention covers a brake system for a vehicle having a brake assembly coupled to an axle which resiliently supports a vehicle body, the vehicle including a control rod extending between the body and the axle to limit the movement therebetween and transmit braking torque from the axle to the body, a master cylinder carrying a first piston to communicate fluid pressure to the brake assembly during braking, the master cylinder carrying a reservoir containing fluid, the brake assembly including a second piston substantially defining a first pressure chamber receiving fluid pressure from the master cylinder during braking, and the second piston also defining a second pressure chamber receiving fluid pressure during braking, characterized in that said control rod defines an auxiliary chamber which is pressurized during braking in response to movement between the body and the axle and said control rod auxiliary chamber communicates with said second pressure chamber in support of said first pressure chamber.

It is an advantage of the present invention that the control rod generates a power assist which is supportive of the master cylinder rather than in opposition to the master cylinder, while also relieving the fluid pressure applied to the second piston in response to a predetermined braking condition.

FIG. 3 is a view similar to FIG. 1 with the brake system shown during initial braking.

FIG. 4 is a view similar to FIG. 3 with the braking system shown during full braking.

FIG. 5 is a view similar to FIG. 4 with the brake system shown during full braking with a skid condition.

Figure 1:
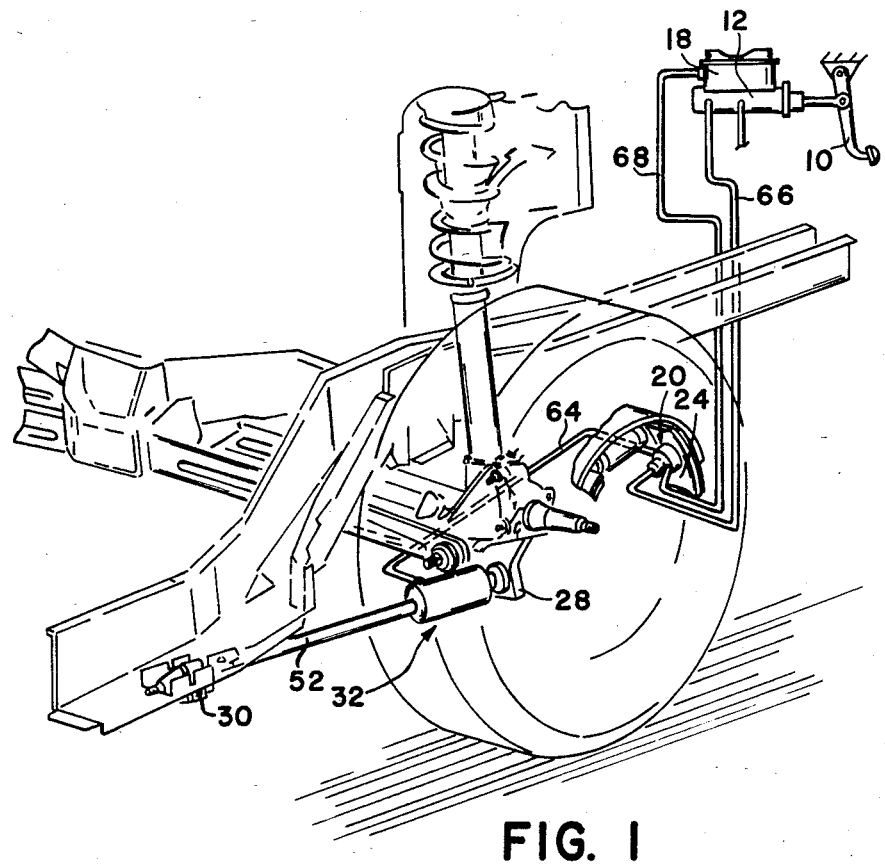
FIG. 1 shows a schematic illustration of a brake system according to the invention herein.
Figure 2:
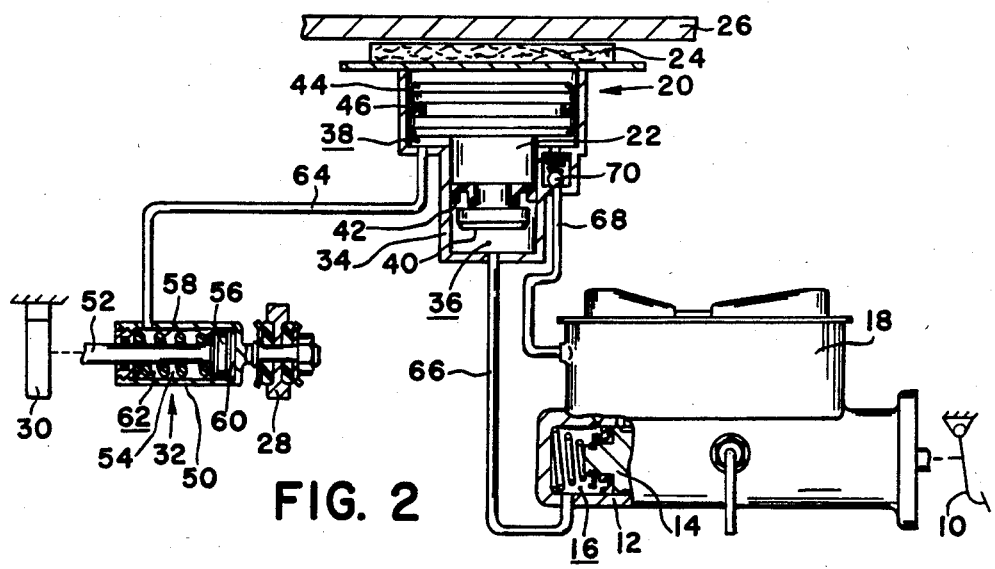
FIG. 2 is a view similar to FIG. 1 with the brake system in a rest mode.

A brake system includes a brake pedal 10 coupled to a master cylinder 12 with at least one piston 14 defining a pressure cavity 16. A reservoir 18 supplies fluid to the pressure cavity 16 in a rest mode. A brake assembly 20, as shown in FIG. 2, includes a second piston 22 cooperating with a friction element 24 to bias the latter into engagement with a drum or rotor 26 associated with a wheel assembly of a vehicle. The brake assembly 20 is illustrated schematically in FIG. 1 to comprise either a drum brake or a disc brake. The wheel assembly is carried by an axle 28 and a vehicle body 30 carries an operator who controls actuation of the brake pedal 10. In order to limit movement between the axle 28 and the body 30, a control rod 32 is connected to the axle 28 and the body 30. The brake assembly 20 includes a housing 34 cooperating with the piston 22 to form a first pressure chamber 36 and a second pressure chamber 38. The piston is stepped so that a small diameter portion 40 carries a one way seal 42 cooperating with the housing to form the first pressure chamber 36. A large diameter portion 44 carries an O ring seal 46 cooperating with the housing and the small diameter portion 40 to form the second pressure chamber 38.

The control rod 32 comprises a first part 50 coupled to the axle 28 and a second part 52 coupled to the body 30. The first part 50 forms a recess 54 to receive an enlarged head 56 of the second part 52. A spring 58 extends between the head 56 and the first part 50 to bias the head 56 against a bottom wall 60 of the recess 54 in a rest mode. The second part 52 cooperates with the first part 50 to define an auxiliary chamber 62. The auxiliary chamber 62 communicates via conduit 64 with the second pressure chamber 38 while the first pressure chamber 36 communicates via conduit 66 with the pressure cavity 16 of the master cylinder 12. A conduit 68 includes a check valve 70 and communicates the reservoir 18 with the second pressure chamber 38 so that fluid is free to flow only from the reservoir 18 to the second pressure chamber 38.

During a brake application, the first piston 14 is moved by the brake pedal 10 to generate fluid pressure in pressure cavity 16 and the first pressure chamber 36. The second piston 22 is moved outwardly of housing 34 to bias the friction element 24 into engagement with the rotor or drum 26 to effectuate a brake application. Expansion of chamber 38 draws fluid therein from conduit 68 via check valve 70. With the body 30 moving forward during braking the axle 28 tends to separate rearwardly from the body 30 as the wheel assembly forms a rolling friction interface with a surface supporting the vehicle. Movement of the axle 28 to the right relative to the body 30 causes the head 56 to contract the spring 58 and generate fluid pressure in auxiliary pressure chamber 62 and the second pressure chamber 38. The fluid pressure in the second pressure chamber supports the fluid pressure in the first pressure chamber 36, as both forces are additive, to increase the engagement between the friction element 24 and the rotor or drum 26. If an excessive amount of fluid pressure is generated in both pressure chambers 36 and 38, the wheel assembly can form a skidding condition with the surface. As a result the forces causing the axle to separate from the body are decreased because sliding friction for the wheel assembly is less than rolling friction, so that the head 56 moves toward the bottom wall 60, as shown in FIG. 5, to decrease the fluid pressure in the auxiliary chamber 62 and the second pressure chamber 38. By reducing the fluid pressure in the second pressure chamber, the force applied to the friction element 24 is also reduced to eliminate the skidding condition of the wheel assembly. This reduction in force may occur while maintaining a constant fluid pressure in the pressure cavity 16 and first pressure chamber 36, so that the brake pedal 10 sees the same reaction force at all times. Although the second piston experiences a reduction in the additive forces biasing the latter outwardly, the position of the second piston remains the same during braking and during the skidding condition.

Upon termination of braking, the pistons and control rod are returned to their rest positions. Fluid pressure trapped initially in chamber 38 by check valve 70 will readily flow to chamber 36, via one way seal 42, as the fluid pressure is reduced therein upon termination of braking and to chamber 62 as the latter expands upon termination of braking when the separation forces between the body 30 and the axle 28 are reduced and the head 56 is moved to abut the bottom wall 60. In the rest position fluid from the reservoir 18 is free to flow to the pressure cavity 16 and the second pressure chamber 38. Moreover, in the rest position, an incidental contraction of the auxiliary pressure chamber 62 causes fluid to flow to the second pressure chamber, past the one way seal 42 into the pressure cavity 16 and back to the reservoir as the reservoir is in communication with the pressure cavity 16 in the rest position.

I claim:

1. A brake system for a vehicle having a brake assembly coupled to an axle which resiliently supports a vehicle body, the vehicle including a control rod extending between the body and the axle to limit the movement therebetween and transmit braking torque from the axle to the body, a master cylinder carrying a first piston to communicate fluid pressure to the brake assembly during braking, the master cylinder carrying a reservoir containing fluid, the brake assembly including a second piston substantially defining a first pressure chamber receiving fluid pressure from the master cylinder during braking, and the second piston also defining a second pressure chamber receiving fluid pressure during braking, characterized in that said control rod defines an auxiliary chamber which is pressurized during braking in response to movement between the body and the axle and said auxiliary chamber communicates fluid pressure to said second pressure chamber in support of said first pressure chamber.

2. The brake system of claim 1 in which said second pressure chamber communicates with said reservoir via a check valve permitting fluid flow from said reservoir to said second pressure chamber.

3. The brake system of claim 1 in which said first piston defines a pressure cavity normally communicating with said reservoir in a rest position and said auxiliary chamber also communicates with said reservoir via said second pressure chamber, a one-way seal on said second piston, said first pressure chamber, and said pressure cavity.

4. The brake system of claim 1 in which said second piston is stepped to form a small diameter portion adjoining said first pressure chamber and a large diameter portion adjoining said second pressure chamber.

5. The brake system of claim 4 in which said small diameter portion cooperates with a cup seal permitting one way fluid communication from said second pressure chamber to said first pressure chamber.

6. The brake system of claim 4 in which said first piston generates fluid pressure in said first pressure chamber to bias said second piston to a brake applied position during braking, said control rod generates fluid pressure in said second pressure chamber to further bias said second piston to a brake applied position during braking, and said control rod is operable in response to a skidding condition for a wheel of the axle to reduce the fluid pressure in said second pressure chamber while the fluid pressure in said first pressure chamber remains substantially the same.

* * * * *